Jan. 21, 1969

R. R. ROSS ET AL 3,422,743

BLAST ACTUATED VALVE

Filed Aug. 16. 1967

INVENTORS: R.R. ROSS
K.B. WOODARD
BY
Stoddard
ATTORNEY

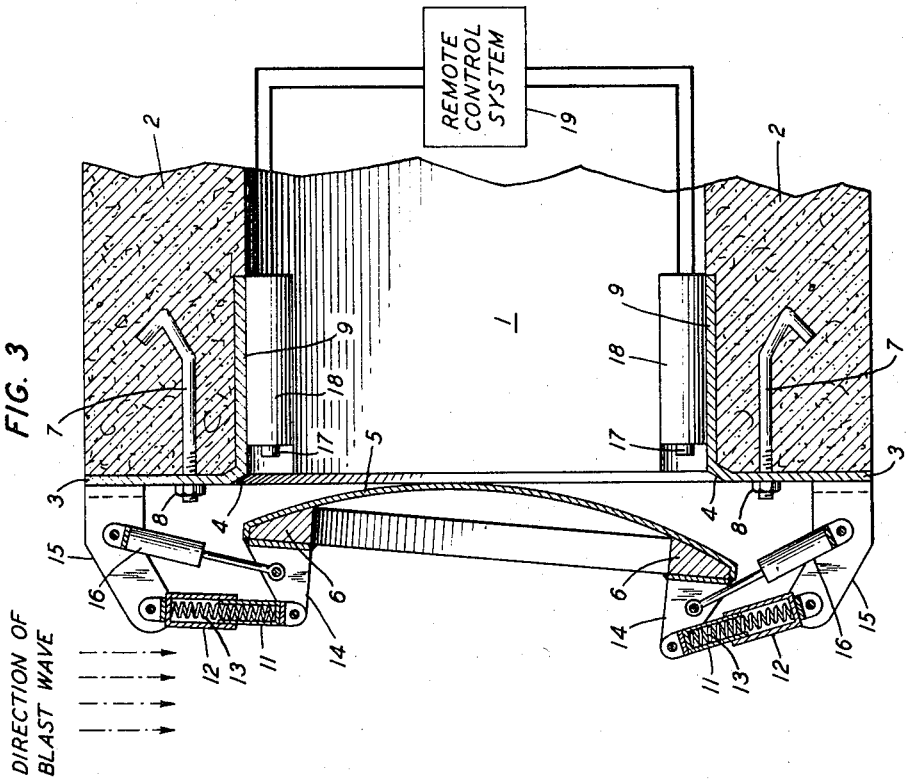
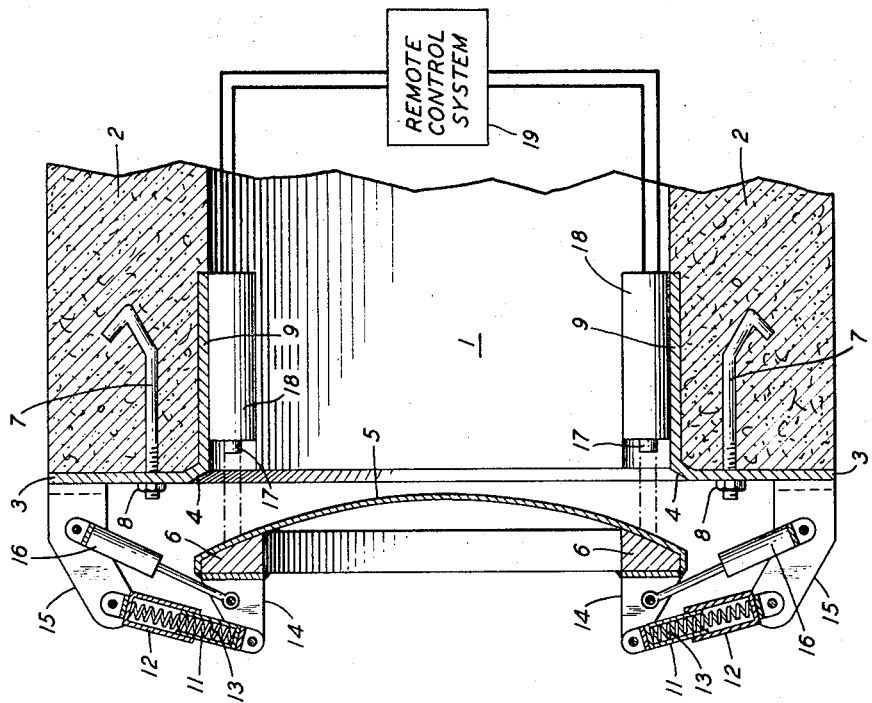

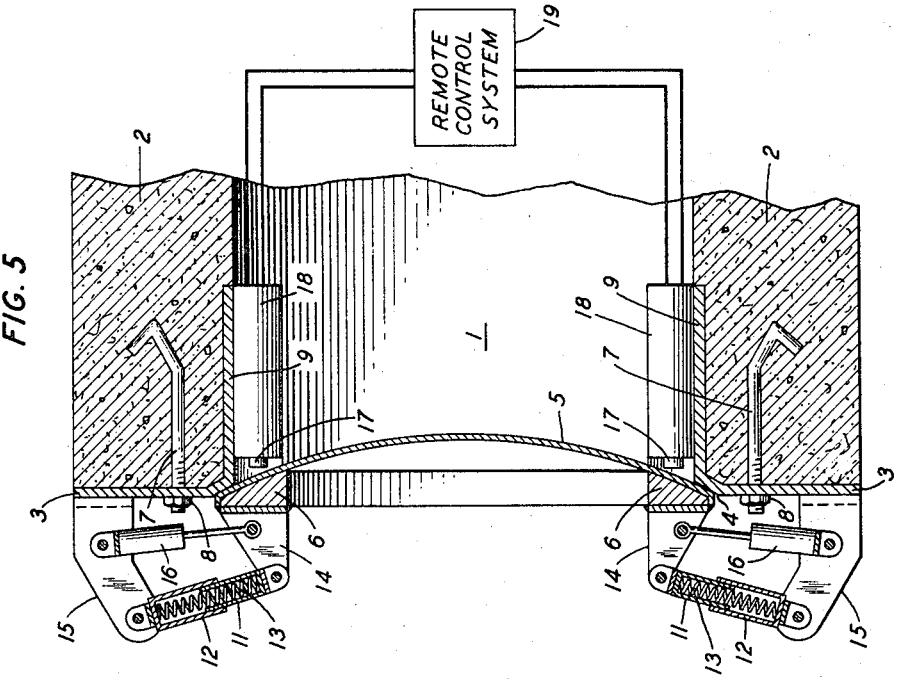
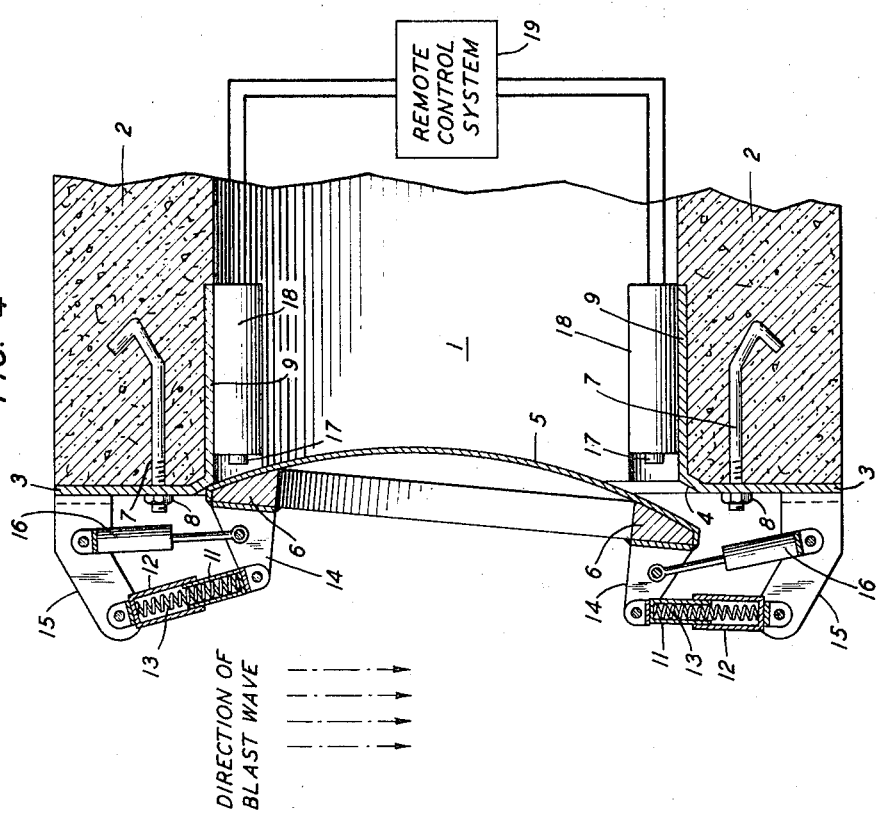

# United States Patent Office 3,422,743
Patented Jan. 21, 1969

3,422,743
BLAST ACTUATED VALVE
Robert R. Ross, Basking Ridge, N.J., and Kenneth B. Woodard, Indianapolis, Ind., assignors to Bell Telephone Laboratories, Incorporated, Murray Hill, N.J., a corporation of New York
Filed Aug. 16, 1967, Ser. No. 661,057
U.S. Cl. 98—119                                22 Claims
Int. Cl. F231 *17/00;* F16k *17/00, 15/00*

ABSTRACT OF THE DISCLOSURE

A blast actuated valve closure system employing a shaftless poppet type of valve comprising a thin membranous valve cover plate in the shape of a domed cap for a pressure vessel and attached to a strong peripheral ring which is supported by compression springs having their motion limited, guided, and cushioned by shock absorbers.

Background of the invention

This invention relates to valve closure systems and, more particularly, to an improved valve closure system that is actuated automatically in response to the overpressure of a blast.

Protection against blasts from atomic or other explosions may be obtained by constructing a strongly reinforced chamber in a favorable location, such as at a suitable depth under the surface of the earth. A chamber of this type is usually equipped with a ventilating system having a number of ducts extending from the chamber to the surface of the ground. Some of these ducts function as intake ducts for admitting fresh air to the chamber while other of the ducts serve as exhaust ducts for removing stale air from the chamber. Both of these types of ducts are, in general, provided with valve closure devices for sealing them against overpressure when a blast occurs. This is especially necessary in the event of an atomic explosion in order to exclude radioactive fallout and the blast pressures which are of relatively long duration.

These valve closure devices can be operated by various types of sensing systems which are designed to detect the occurrence of a blast. The sensing systems are usually designed to operate the valve closing devices so that they will be closed before the arrival of the airblast wave. However, as a safety precaution against a possible failure of a sensing system, it is desirable that the valve closing devices be so designed as to become closed automatically when a sudden overpressure impinges upon them.

Heretofore, such automatically operated valve closing devices have not been fully satisfactory because they have had heavy bulky constructions utilizing shafts or slide members for guiding and restricting the direction of motion of the valve cover plates. In order for these devices to resist bending and to be capable of withstanding impact or restraining loads when stopping at the seated position, it has been necessary for these valve closing devices to employ complicated massive parts. In other words, to enable the closure systems to endure airblast pressure loading, shock-front interaction, and heavy impact on seating, the prior art has resorted to the use of massive parts having their motion guided and restricted by other massive parts. This heavy construction has been objectionable because it is expensive and its operation is not sufficiently rapid. Furthermore, it has poor air-capacity capability in relation to the diameters of the major parts thus causing large air losses during normal air-handling or ventilating operations.

Summary of the invention

The present invention is designed to overcome the objections discussed above by providing an improved automatically operated valve closure system which is simpler, cheaper, and more reliable than valve closures of the prior art. The valve closure system of this invention is a shaftless poppet type of valve having a lightweight domed cover plate adapted to fit into an annular valve seat which surrounds the entrance to a duct. The valve cover plate is a thin membrane or diaphragm formed as a section of a hollow sphere so that it has the shape of a domed cap for a pressure vessel. It is disposed with its convex side facing the valve seat so that its concave side will receive the load or tension force of a blast pressure wave. This cover plate is attached to a strong peripheral annular support which is designed to take the blast tension load from the diaphragm.

The annular support is attached to a plurality of resilient members in the form of compression springs which are pivotally mounted at spaced intervals around the valve seat. These springs have two states of equilibrium for providing bistable support for the ring and its cover plate in either an open position or a closed position. Since there is no supporting shaft or piston, the springs permit the cover plate to tilt in response to unsymmetrical loading produced by shock waves approaching from directions other than a frontal direction. Shock absorbers are mounted adjacent to the springs for limiting the extent of their motion and for guiding the valve cover plate into its seat while cushioning the closing impact.

Thus, this novel design construction results in a fast-acting, lightweight valve closure system that has a low pressure drop while passing normal ventilating air and which will automatically close rapidly in response to shock overpressure approaching from any direction. Therefore, the valve closure system of this invention is simpler, cheaper, more reliable, and operates more quickly than other blast closure systems. It constitutes a distinct advance over previous closure systems which have generally employed central supporting shafts and guide members that had to be made massive in order to resist bending caused by unsymmetrical loading due to the nature of a blast wave or to the direction from which it approaches the valve closure system. These prior art shafts and guides, in addition to being massive, usually required close manufacturing tolerances which further increased their cost.

Another advantage of the present invention is that its air losses are low in comparison with previous blast closure systems which employ massive structures that are, of necessity, placed in the ventilating airstream thereby restricting the flow of air and producing substantial air losses. Because of these air losses, the prior closure systems had to be made larger than would otherwise be necessary thus further increasing their cost.

It should be particularly noted that the valve closure system of this invention possesses the important advantage of virtually eliminating large bending loads because its novel design enables its valve cover plate to tilt in any direction in accordance with the angle of approach of a nonfrontal blast wave.

Brief description of the drawing

The features of this invention are fully discussed hereinafter in relation to the following detailed description of the drawing in which:

FIG. 2 is a side view, partly in section, of the valve closure system in its normally open ventilating condition;

FIG. 3 is a somewhat similar side view showing the valve closure system in a partly closed condition due to the approach of a nonfrontal blast wave;

FIG. 4 is a side view of the valve closure system in its nearly closed condition; and FIG. 5 is a side view of the valve closure system in its closed condition.

*Detailed description*

Figure 1:
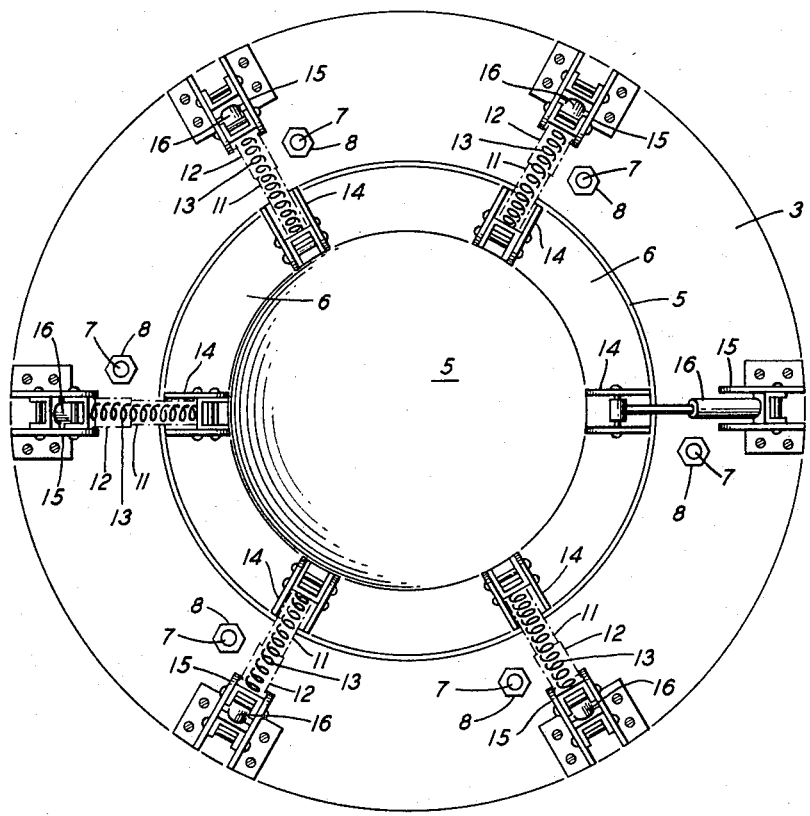
FIG. 1 is a plan view of a valve closure system in accordance with this invention.

The blast actuated valve closure system of this invention is associated with a ventilating duct 1 extending to an underground chamber which is not shown as it forms no part of the invention. The duct 1 may be either an intake duct or an exhaust duct and is securely held by a concrete emplacement or support 2. The mouth or opening of the duct 1 has a circular shape and is surrounded by a metallic base plate 3 having the shape of an annulus. The base plate 3 is firmly secured to the concrete emplacement 2 by any suitable means, such as by a plurality of anchor bolts or J-hooks 7 and nuts 8. The inner edge 4 of the base plate 3 is beveled for forming a valve seat that is adapted for receiving therein a valve cover plate 5 which is attached to a movable annular support 6. The support 6 is made of strong material so as to take the tension load applied to the valve cover plate 5 by a blast pressure wave.

The valve cover plate 5 is a lightweight metallic membrane or diaphragm which is formed as a section of a hollow sphere so that it has the shape of a domed cap for a pressure vessel. As can be seen in the drawing, the convex side of the valve cover plate 5 faces the entrance or mouth of the duct 1. Accordingly, the concave side of the valve cover plate 5 is so disposed as to face outward for receiving the force of a blast pressure wave.

Various means may be employed for securing the valve cover plate 5 to its support 6 which is in the form of a strong metallic plate having an annular shape. One arrangement employs an inner peripheral ring having the border of the cover plate 5 wrapped around the outer edge of the ring and fastened thereto by bolts or rivets. The cover plate 5 and the ring are attached to the inner edge of the annular support 6 in any suitable manner, such as by welding.

However, in the exemplary embodiment of the invention that is shown in the drawing, the border of the cover plate 5 is bent, or wrapped, around the outer edge of the annular support 6 and is secured thereto by any appropriate means, such as by welding. As is represented in the drawing, the thickness of the annular support 6 varies gradually from a maximum at its inner edge to a minimum at its outer edge. Due to this construction, the curved surface of the cover plate 5 is maintained and firmly supported along its marginal area so that, when the cover plate 5 is in its closed position shown in FIG. 5, it will fit snugly against the valve seat formed by the beveled edge 4 of the plate 3.

A plurality of resilient members in the form of compression springs 13 are provided for suspending the valve cover plate 5 and its annular support 6 in front of the mouth of the duct 1. Each spring 13 has one end pivotally mounted in a bracket 14 that is securely fastened to the annular support 6. The other end of each spring 13 is pivotally mounted on a bracket 15 which is attached to the base plate 3. As can be seen in the drawing, the pivotal supporting means constituted by the brackets 14 and 15 are so mounted as to project outward in advance of the plane of the mouth of the duct 1. The springs 13 are thus mounted for swinging motion alternatively toward and away from the mouth of the duct 1. The springs 13 are preferably spaced equidistantly around the valve cover plate 5 as is shown in FIG. 1. In order to prevent buckling or bending of the springs 13, each of the springs 13 is provided with suitable telescoping guides, such as a sleeve 11 adapted to slide within another sleeve 12, as is indicated in the drawing.

These springs 13 are designed and mounted in such a manner as to have two states of equilibrium for providing bistable support to the valve cover plate 5. Thus, as is shown in FIG. 2, in one stable position, the springs 13 slant upward and push outward from the mouth of the duct 1 thereby holding the valve cover plate 5 in its open position. In the other stable position, the springs 13 tilt downward and push inward toward the mouth of the duct 1, as shown in FIG. 5, for holding the valve cover plate 5 in its closed position.

Each of the springs 13 has associated with it a shock absorber 16 which has its ends pivotally attached to the brackets 14 and 15 for swinging motion alternatively toward and away from the mouth of the duct 1. It should be noted that, in FIG. 1, the right central spring has not been shown in order to illustrate the mounting of the shock absorber 16 at this location. These shock absorbers 16 are both extensible and retractible and they function to limit the stretching and compressional motion of the springs 13. They also function to guide the valve cover plate 5 into its closed position and to lessen the forces of final impact against the valve seat constituted by the beveled edge 4 of the base plate 3.

Each of the shock absorbers 16 has the same maximum finite length when it is fully extended in either the position shown in FIG. 2 or the position shown in FIG. 5. When the valve cover plate 5 is in its open position wherein it is spaced apart from the valve seat 4 as is shown in FIG. 2, the shock absorbers 16 are stretched outward from the mouth of the duct 1 to their fully extended length thus limiting the outward motion of the springs 13 and thereby fixing or determining the normal open position of the valve cover plate 5. The shock absorbers 16 are so mounted on the mounting means formed by the brackets 14 and 15 that, when the valve cover plate 5 is in its closed position shown in FIG. 5, they are stretched inward toward the mouth of the duct 1 to the full extent of their maximum finite length. This serves accurately to center the valve cover plate 5 in its closed position against its seat 4.

One of the advantages of employing the combination of springs 13 and shock absorbers 16 is that, since there is no supporting shaft or piston, the valve cover plate 5 is not restricted to planar motion but, instead, is permitted to tilt in response to unsymmetrical loading caused by shock waves approaching from directions other than a frontal direction. Therefore, the blast trip capability is not dependent upon symmetry of the shock front nor the direction of its approach. As soon as motion is initiated by the impingement of either a symmetrical or an asymmetrical blast load against the valve cover plate 5, the blast loading and the system of compression springs 13 propel the valve cover plate 5 toward the mouth of the duct 1 and the shock absorbers 16 accurately center it in the seat 4 and cushion its impact.

As was stated above, FIG. 2 shows the valve closure system in its normally open or cocked position wherein air can pass through the mouth of the duct 1. Let it now be assumed that a shock overpressure wave approaches from a frontal direction thus applying a large symmetrical load to the valve cover plate 5 and forcing it to move directly inward toward its seat 4. This movement of the valve cover plate 5 toward its closed position, shown in FIG. 5, causes the springs 13 to swing downward toward the mouth of the duct 1. These compression springs 13 are so designed that they act as toggles with the result that, after they have passed their central position, their compressional force augments the closing load on the valve cover plate 5 thereby tending to increase the rapidity of its closing action.

Before the arrival of the blast wave, the shock absorbers 16 are in their normal positions wherein they each have a maximum finite extended length. The initial inward movement of the valve cover plate 5 forces the lengths of the shock absorbers 16 to become reduced so that their lengths are at a minimum when the valve cover plate 5 is midway between its open and closed positions. Further inward movement of the valve cover plate 5 forces the shock absorbers 16 to become extended again and this provides an arresting force which is proportional to the position and velocity of the valve cover plate 5. This arresting force slows the movement of the valve cover plate 5 into its seated position and cushions its impact against the valve seat 4. It should be noted that, since the fully extended lengths of the shock absorbers 16 are equal at both the open and closed positions of the valve cover plate 5, the shock absorbers 16 function to center the valve cover plate 5 accurately in both positions.

It should also be noted that the compression springs 13 are designed to apply sufficient force for holding the valve cover plate 5 in its closed position during the negative pressure phase of the blast.

When it is subsequently desired to return the valve cover plate 5 to its open position, this can readily be accomplished by means of a plurality of pistons 17 mounted in cylinders 18 that are installed within the duct 1 near the mouth thereof. In this embodiment of the invention, the cylinders 18 are attached to extensions 9 of the base plate 3. These pistons 17 are designed to be operated in any convenient manner, such as by hydraulic action governed by a suitable electric remote control system 20 which is situated at an appropriate location remote from the mouth of the duct 1. Normally, the pistons 17 are retracted within their cylinders 18 so that their tips are immediately beneath the base plate 3 as is shown for example, in FIG. 3.

After the valve cover plate 5 has been moved to its closed position in its seat 4, as is represented in FIG. 5, the electric remote control system 20 is energized for causing the pistons 17 to emerge from their cylinders 18 and to push outward against the bottom of the valve cover plate 5. This protruding motion of the pistons 17 continues until the valve cover plate 5 reaches its open position. At this time, a suitable limit control terminates the movement of the pistons 17 leaving them in their fully extended positions as is indicated by the broken lines in FIG. 2. The electric remote control system 20 then causes the pistons 17 to return to their retracted positions shown in FIG. 3. Thus, the pistons 17 function as actuating means for moving the valve cover plate 5 to its normally open position.

When the valve cover plate 5 passes its middle position during its outward movement, the toggle action of the springs 13 will add their compressional force to the force exerted by the pistons 17. However, since the shock absorbers 16 are now being extended again, they provide a retarding force which limits the outward movement of the valve cover plate 5. Thus, the valve cover plate 5 is again held in its open position, shown in FIG. 2, by the combined action of the springs 13 and the shock absorbers 16.

Let it now be assumed that a shock overpressure wave approaches the valve closure system from a direction other than a frontal direction, such as from the direction indicated in FIG. 3. The pressure from this blast wave is applied to the concave surface of the valve cover plate 5 at an angle and causes it to tilt inward toward the valve seat 4 in the manner represented in FIG. 3. This inward tilting action causes some of the springs 13 to swing downward toward their central position thereby forcing their associated shock absorbers 16 to become shortened.

As soon as one of the springs 13, such as the upper spring 13 shown in FIG. 3, moves inward past its central position, it applies its compressional force to accelerate the tilting action. Since the tilting movement is guided and limited by the shock absorbers 16, an increase of the tilting motion will cause other of the springs 13, such as the lower spring 13 shown in FIG. 4, to move past their central positions. These other springs 13 will now apply their compressional force to effect further inward movement of the valve cover plate 5 and will quickly close it against the valve seat 4, as is shown in FIG. 5, with the closing impact being cushioned by the shock absorbers 16.

It should be noted that, although one edge of the valve cover plate 5 precedes the opposite edge in moving toward the valve seat 4 during this tilting motion, the controlled and preset travel dimensions of the shock absorbers 16 will function to center the valve cover plate 5 accurately within the valve seat 4.

What is claimed is:

1. A blast actuated valve closure system adapted for closing an opening in response to the overpressure of a blast,
    said system comprising a valve cover plate in the shape of a section of a sphere and having both a convex surface and a concave surface,
    and an annular valve seat surrounding said opening and adapted to receive said valve cover plate whereby said opening becomes closed,
    said system being characterized in that said valve cover plate is fabricated in the form of a thin membrane,
    and further comprising movable supporting means for holding said valve cover plate in two alternative stable positions with said convex surface facing said valve seat and said concave surface facing outward for receiving the force of a blast pressure wave,
    one of said positions being in said valve seat and the other being spaced apart from said valve seat,
    and said supporting means including a plurality of extensible and retractible members.

2. A blast actuated valve closure system in accordance with claim 1 and further comprising means for taking a tension load applied to said membrane,
    said means including an annular member having the border of said membrane secured thereto.

3. A blast actuated valve closure system in accordance with claim 2 wherein each of said extensible and retractible members has a first end and a second end,
    and further comprising means attached to said annular member for receiving and holding said first end of each of said extensible and retractible members.

4. A blast actuated valve closure system in accordance with claim 3 and further comprising a base member surrounding said opening,
    and means on said base member for receiving and holding said second end of each of said extensible and retractible members.

5. A blast actuated valve closure system in accordance with claim 4 wherein said valve cover plate is adapted to be moved to its position in said valve seat in response to the force of a blast pressure valve,
    and further comprising actuating means for moving said valve cover plate to its said position spaced apart from said valve seat,
    said actuating means being positioned inside said opening,
    and control means for effecting the operation of said actuating means,
    said control means being located at a point remote from said opening.

6. A blast actuated valve closure system in accordance with claim 5 wherein said base member comprises means extending inside said opening and adapted for receiving and holding said opening means.

7. A blast actuated valve closure system adapted for closing the mouth of a duct in response to the overpressure of a blast,
    said system comprising a thin diaphragmatic valve cover plate in the shape of a domed cap for a pressure vessel and having both a convex surface and a concave surface,
    an annular valve seat surrounding said mouth of said duct,
    suspensory mounting means adapted for normally suspending said valve cover plate in front of said mouth with its convex surface facing said valve seat and its concave surface facing outward for receiving the force of a blast pressure wave, said valve cover plate being adapted to be moved inward against said valve seat in response to force applied by a blast pressure wave to its concave surface whereby said mouth becomes closed, and said suspensory mounting means including a plurality of resilient members attached to said valve cover plate whereby it becomes tilted in response to unsymmetrical loading applied thereto by a non-frontal blast pressure wave.

8. A blast actuated valve closure system adapted for closing the mouth of a duct in response to the overpressure of a blast, said system comprising a thin diaphragmatic valve cover plate in the shape of a domed cap for a pressure vessel and having both a convex surface and a concave surface, an annular valve seat surrounding said mouth of said duct, said valve cover plate being normally disposed in a position spaced in front of said mouth and its convex surface facing said valve seat and its concave surface facing outward for receiving the force of a blast pressure wave, said valve cover plate being adapted to be moved inward against said valve seat in response to force applied by a blast pressure wave to its concave surface whereby said mouth becomes closed, and a plurality of resilient members disposed at intervals around said valve seat and mounted at positions spaced in advance of the plane of said mouth, each of said resilient members having a portion thereof attached to said valve cover plate for suspending it in a tiltable position whereby it becomes tilted in response to unsymmetrical loading applied thereto by a blast pressure wave approaching from a non-frontal direction.

9. A blast actuated valve closure system adapted for closing the mouth of a duct in response to the overpressure of a blast, said system comprising a thin diaphragmatic valve cover plate in the shape of a domed cap for a pressure vessel and having both a convex surface and a concave surface, an annular valve seat surrounding said mouth of said duct, said valve cover plate being normally disposed in a position in front of said mouth with its convex surface facing said valve seat and its concave surface facing outward for receiving the force of a blast pressure wave, said valve cover plate being adapted to be moved inward against said valve seat in response to force applied by a blast pressure wave to its concave surface whereby said mouth becomes closed, a plurality of mounting means disposed at intervals around said valve seat and projecting outwardly in advance of the plane of said mouth, a plurality of springs each having two ends, each of said springs having one end pivotally attached to a respectively different one of said mounting means for swinging motion of its other end alternatively toward and away from said mouth, and means for attaching said other end of each of said springs to a respectively different portion of said valve cover plate for suspending it in a tiltable position in advance of said valve seat whereby it becomes tilted in response to unsymmetrical loading applied thereto by a blast pressure wave approaching from a non-frontal direction.

10. A blast actuated valve closure system in accordance with claim 9 wherein each of said springs is a compression spring adapted for pressing against said valve cover plate, and wherein said springs are so attached to said mounting means and to said valve cover plate as to have two states of equilibrium for providing bistable support to said valve cover plate, one of said states of equilibrium being with said springs pushing said valve cover plate outward away from said valve seat, and the other of said two states of equilibrium being with said springs pushing said valve cover plate inward against said valve seat.

11. A blast actuated valve closure system in accordance with claim 10 wherein each of said compression springs has a length that is adapted to be alternatively compressed and extended, and further comprising limiting means for limiting the extent of said extended length of each of said springs, said limiting means including a plurality of extensible and retractible members.

12. A blast actuated valve closure system in accordance with claim 11 wherein each of said extensible and retractible members comprises a shock absorber, and further comprising means for pivotally attaching each of said shock absorbers to a respectively different one of said mounting means.

13. A blast actuated valve closure system in accordance with claim 9 and further comprising a support member for supporting said valve cover plate and for taking a tension load applied thereto, said support member having an annular shape with an outer edge and an inner edge, and means for fastening the border of said valve cover plate to one edge of said support member.

14. A blast actuated valve closure system in accordance with claim 13 wherein said one edge is the outer edge of said support member, and wherein the thickness of said support member varies gradually from a maximum at its inner edge to a minimum at its outer edge whereby the curved surface of said valve cover plate is maintained and firmly supported along its marginal area.

15. A blast actuated valve closure system in accordance with claim 13 and further comprising a second plurality of mounting means, said second plurality of mounting means being disposed at intervals on said support member, and means for pivotally attaching said other end of each of said springs to a respectively different one of said second plurality of mounting means.

16. A blast actuated valve closure system in accordance with claim 15 and further comprising a plurality of shock absorbers for limiting and guiding the motion of said springs, each of said shock absorbers having two ends, one end of each of said shock absorbers being pivotally attached to a respectively different one of said means in said first-mentioned plurality of mounting means, and the other end of each of said shock absorbers being pivotally attached to a respectively different one of said means in said second plurality of mounting means.

17. A blast actuated valve closure system in accordance with claim 16 wherein each of said shock absorbers is of the type having a length which is alternatively extensible and retractible, and said extensible length of each of said shock absorbers having the same maximum finite dimension whereby said valve cover plate is accurately centered both in its open position and in its closed position.

18. A blast actuated valve closure system adapted for closing an opening in response to the overpressure of a blast, said system comprising a thin membranous valve cover plate in the shape of a section of a hollow sphere and having convex and concave sides, an annular valve seat surrounding said opening and adapted to receive said valve cover plate whereby said opening becomes closed, supporting means for supporting said valve cover plate in front of said opening in two positions of rest with its convex side facing said valve seat and its concave side facing outward for receiving the shock pressure produced by a blast, one of said positions being a normally open position spaced in advance of said valve seat and the other of said positions being a closed position in said valve seat and fitting firmly thereagainst, said supporting means being actuable for moving said valve cover plate into its closed position against said valve seat in response to shock pressure applied by a blast to said concave side of said valve cover plate, and said supporting means including instrumentalities adapted for constantly applying force to said valve cover plate for securely maintaining it in both its open and closed positions alternatively.

19. A blast actuated valve closure system in accordance with claim 18 wherein said instrumentalities comprise a plurality of compression springs each adapted for constantly pressing against said valve cover plate.

20. A blast actuated valve closure system in accordance with claim 19 and further comprising mounting means adapted for pivotally mounting each of said compression springs for swinging motion in accordance with movement of said valve cover plate from one of its said positions to the other of its said positions.

21. A blast actuated valve closure system in accordance with claim 19 and further comprising means for centering said valve cover plate in both its open and closed positions alternatively, said last-mentioned means including a plurality of extensible and retractible members each adapted for limiting the maximum extended length of a respectively different one of said compression springs.

22. A blast actuated valve closure system in accordance with claim 21 wherein said extensible and retractible members each have the same maximum finite length, and further comprising mounting means adapted for pivotally mounting said extensible and retractible members for swinging motion in accordance with movement of said valve cover plate from one of its said positions to the other of its said positions.

References Cited

UNITED STATES PATENTS 3,069,993   12/1962   Allgood _____ 98—119

HAROLD W. WEAKLEY, *Primary Examiner.*

U.S. Cl. X.R.

137—517, 460, 461